United States Patent [19]

Ander

[11] Patent Number: 6,140,912
[45] Date of Patent: Oct. 31, 2000

[54] METHOD AND A DEVICE FOR TELECOMMUNICATION

[75] Inventor: Carl Ander, Djursholm, Sweden

[73] Assignee: Gratistelefon Svenska AB, Stockholm, Sweden

[21] Appl. No.: 08/836,406

[22] PCT Filed: Oct. 31, 1995

[86] PCT No.: PCT/SE95/01286

§ 371 Date: May 1, 1997

§ 102(e) Date: May 1, 1997

[87] PCT Pub. No.: WO96/14706

PCT Pub. Date: May 17, 1996

[30] Foreign Application Priority Data

Nov. 4, 1994 [SE] Sweden .................................. 9403793

[51] Int. Cl.[7] .............................. G08B 23/00; H04M 3/42
[52] U.S. Cl. ...................... 340/313; 340/311.1; 379/202; 455/408
[58] Field of Search ................................. 340/311.1, 313, 340/425.1, 539; 379/112, 113, 114, 115, 201, 202, 203, 204, 205, 265, 266, 309; 320/260, 261, 262; 455/408

[56] References Cited

U.S. PATENT DOCUMENTS

| | | | |
|---|---|---|---|
| 4,054,756 | 10/1977 | Comella et al. | 379/114 |
| 4,757,267 | 7/1988 | Riskin | 379/113 |
| 4,850,007 | 7/1989 | Marino et al. | 379/67 |
| 5,187,710 | 2/1993 | Chau et al. | 379/114 |
| 5,333,186 | 7/1994 | Gupta | 379/114 |
| 5,452,348 | 9/1995 | Adams et al. | 379/202 |
| 5,539,807 | 7/1996 | Ghisler et al. | 455/408 |

FOREIGN PATENT DOCUMENTS

WO9106187  5/1991  WIPO .............................. H04M 3/42

*Primary Examiner*—Jeffery A. Hofsass
*Assistant Examiner*—Van T. Trieu
*Attorney, Agent, or Firm*—Alfred J. Mangels

[57] ABSTRACT

A method and apparatus for forwarding and billing a telephone call, wherein a first subscriber telephone is connected to a second subscriber telephone via a standard telephone network and a third subscriber is billed for the call. The first subscriber dials a prefix followed by a subscriber number which leads to the third subscriber and also dials a subscriber number which leads to the second subscriber. The prefix causes the telephone network to connect the call via the telephone network to a computer unit that is associated with the third subscriber and that is connected to the telephone network. The prefix also causes the computer unit to forward the call to the second subscriber via the computer unit, to connect the first subscriber with the second subscriber. Detection of the prefix by the telephone network causes the network to bill the call between the first and the second subscriber to the subscription of the third subscriber.

14 Claims, 1 Drawing Sheet

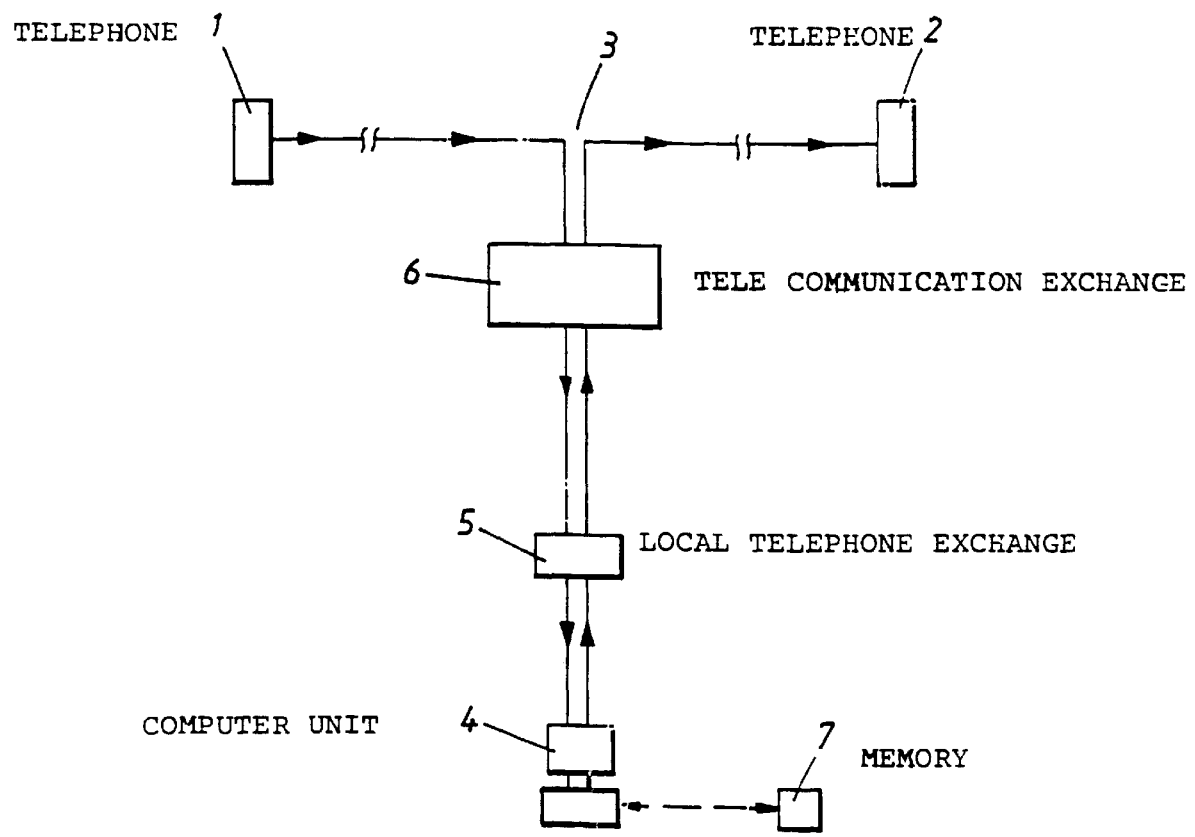

METHOD AND A DEVICE FOR TELECOMMUNICATION

BACKGROUND OF THE INVENTION

1. Field of the Invention

The present invention relates to a method of forwarding and billing a telephone call, and also to therefor apparatus for carrying out the method.

2. Description of the Related Art

In present-day telephone systems, it is only possible to allow the subscriber who calls another subscriber to pay for the call without engaging manual services. However, it is possible to allow the called subscriber to pay for the call by engaging a manual service offered by the telephone company concerned. In Sweden, however, the receiving subscriber is allowed to pay for a call without engaging a manual service, provided that the receiving subscriber has a so-called 020 number.

It is not possible to allow a third person to pay for the call.

SUMMARY OF THE INVENTION

The present invention relates to a method and to a device for enabling a third person to pay for a telephone call between two subscribers without engaging a manual service.

Thus, the present invention relates to a method of forwarding and billing a telephone call wherein a first subscriber telephone is connected to a second subscriber telephone over a standard telephone network. The first subscriber dials a prefix followed by a subscriber, number which leads to a third subscriber and also a subscriber number which leads to a second subscriber. The prefix causes the telephone network to connect the call, via the telephone network, to a computer unit associated with the third subscriber and that is also connected to the telephone network. The prefix and also causes the computer unit to forward the call to the second subscriber via the computer unit, so as to connect the first subscriber with the second subscriber. Detection of the prefix by the telephone network causes the network to bill the call between the first and the second subscriber to the subscription (subscriber account) of the third subscriber.

The invention also relates to apparatus for carrying out the method.

BRIEF DESCRIPTION OF THE DRAWINGS

The invention will now be described in more detail with reference to an exemplifying embodiment thereof and also with reference to the accompanying drawing, in which FIG. 1 is a block schematic which illustrates the telecommunication.

DESCRIPTION OF THE PREFERRED EMBODIMENTS

The present invention thus relates to a method of forwarding and billing a telephone call, wherein a first subscriber telephone is connected to a second subscriber telephone via a standard telephone network. The standard telephone network may be both a public switched telephone network and a mobile telephone network.

According to the present invention, the connection of a telephone call is established by virtue of the first subscriber dialling a prefix followed by a subscriber number, referred to below as 333 333, by way of example, which leads to a third subscriber, and further dials a subscriber number which leads to a second subscriber, referred to below as 222 222 by way of example. According to one embodiment, this can be achieved by first dialling the first subscriber prefix followed by the number 333 333, therewith connecting the first subscriber to that third subscriber. When that connection has been established, the first subscriber then dials the number 222 222, therewith forwarding the call to the second subscriber. According to one alternative embodiment, the first subscriber instead dials the prefix and then dials the numbers 333 333 and 222 222, whereafter the call is connected to the third subscriber followed by a call connection to the second subscriber.

By prefix is meant a number, for instance 030, or some other appropriate number. Thus, in the case of this latter alternative, the first subscriber will dial 030 333 333 222 222.

The prefix causes the telephone network to connect the call; via the network, to a computer unit belonging to the third subscriber, having the number 333 333, and connected to the telephone network. The prefix also causes the computer unit to forward the call to the second subscriber, having the number 222 222, via the computer unit, such as to establish a connection between the first subscriber and the second subscriber. However, the last-mentioned call is connected so as to proceed via the third subscriber.

The telephone network, for instance a telephone switching center, in a telecommunications exchange, is caused to detect the prefix, for instance in the same way as the prefix 020 is detected in Sweden. Detection of the prefix by the telephone network causes the network to bill the call between the first and the second subscribers to the subscription of the third subscriber.

Thus, a first subscriber is able to establish a call connection with a second subscriber through the medium of a third subscriber with the third subscriber being billed for the cost of the call.

FIG. 1 illustrates an inventive system for forwarding a telephone call and billing for the call, wherein a first subscriber telephone 1 is connected to a second subscriber telephone 2 via a standard telephone network, generally indicated by reference numeral 3.

In accordance with the invention, a third subscriber has a computer unit 4 which is connected to the telephone network 3. The computer unit 4 is adapted to detect a prefix dialled by a first subscriber, followed by a subscriber number, which leads to the third subscriber. The third subscriber may have a local telephone exchange or telephone switching center 5 to which the computer unit 4 is connected. The telephone exchange 5 may be constructed to connect an incoming call to the computer unit upon detection of the prefix. Upon detection of the prefix, the computer unit 4 functions to forward the call, via the telephone network, to a second subscriber number dialled by the first subscriber after having dialled the first-mentioned third subscriber number, to connect the first subscriber with the second subscriber.

The telephone network 3 is also designed to bill the call between the first and the second subscriber to the subscription of the third subscriber, upon detection of the prefix. The prefix is suitably detected in a telephone switching center in a telecommunications exchange 6 associated with the telephone network, for billing of the call.

This service may, for instance, be used for good-will purposes, so as to make known certain telephone numbers and those companies or organizations to which the telephone numbers belong, by requiring the telephone number of the company or the organization to be dialled after having dialled the prefix, in order to be able to utilize the service.

According to one highly preferred embodiment, the computer unit is constructed to transmit information on the call connection between the first and the second subscribers at certain time intervals.

According to a first embodiment, this information is transmitted so that both the first and the second subscribers can hear the information although by are unable to converse with one another while the information is being transmitted.

According to a second embodiment, the information is transmitted so that both the first and the second subscribers are able to hear the information and also converse with one another at the same time.

This information will preferably constitute advertising information concerning the company or the organization that is the third subscriber.

For instance, a chain of hamburger restaurants or a chain of gas filling stations may have a computer unit to which a telephone number consisting of a prefix followed by the subscriber number leads. When the first subscriber has been connected to the computer unit, or when the first subscriber has been connected to the second subscriber, the aforesaid advertising information may for instance be information concerning price-cut offers or ongoing "sale" drives.

In this case, the first subscriber is not billed for the call to the second subscriber, whereas the company or organization concerned delivers its advertised offer to at least the first subscriber, but preferably to both the first subscriber and the second subscriber.

According to one preferred embodiment of the invention, information is transmitted over short time periods, such that the total information transmission time will be less than 20% of the total call time.

For instance, an advertisement can be transmitted for a period of five seconds after a call has been in progress for thirty seconds, whereafter the call is allowed to proceed for a further thirty seconds and then interspersed with an advertising transmission for five seconds, and so on.

According to one preferred embodiment of the invention, the duration of a call connection is limited in accordance with a predetermined call cost. For instance, the call cost can be limited to correspond to a call of five minutes on a local call tariff. In the case of trunk calls within a given country, the call cost may be limited to correspond to two minutes, for instance. Naturally, shorter call times are conceivable also in the case of international calls.

Obviously, the duration of a call can vary markedly from case to case, and it may be decided that calls can only be connected within geographically limited areas.

It has been mentioned in the foregoing that a company or an organization may be equipped with the computer unit. However, the invention can also be applied to a pool of companies which commonly connect a computer unit to the telephone network. In this case, transmissions advertising the amenities offered by the various companies associated with the pool is transmitted either as a "mixed bag" or in a predetermined sequence. In this case, the prefix and a number lead to the computer unit.

According to one embodiment of the invention, the advertisement is controlled in accordance with the districts or places in which the first subscriber and the second subscriber are located. For instance, if the first subscriber is located in Stockholm and the second subscriber is located in Gothenburg, and the first subscriber dials the prefix and a number which leads to a company in Stockholm, advertising information concerning a Stockholm company can be transmitted to the first subscriber, while sending, at the same time, to the second subscriber advertising information concerning a Gothenburg company. The advertising information can thus be controlled to relate to the district or place in which respective subscribers are located.

The advertising information may be stored in the computer unit, on data media, such as in a permanent memory or on a CD-disk, or on a tape recorder connected to the computer. The reference numeral 7 in FIG. 1 identifies an external memory or a tape recorder.

It is evident that the present invention solves the problem mentioned in the introduction, of allowing a third subscriber to pay for a call between two other subscribers.

The term third subscriber has been used in the foregoing and in the following Claims. Naturally, this term, or expression, includes a third subscriber who subscribes to the telephone network company concerned. However, the term also includes the case when the computer unit is installed with a given subscriber but when a party other than the party having the subscription where the computer unit is connected is debited for the cost of the call.

It will also be understood that the present invention can be used successively as a marketing instrument for the company and organization concerned, to the benefit of both the company and the organization and the persons conversing on a call established through the medium of the computer unit.

It will also be understood that modifications can be carried out. For instance, the computer unit may comprise totally or partially a local telephone exchange in a company or an organization. The computer unit may also comprise, either totally or partially, a telecommunications exchange included in the telephone network.

The present invention shall not therefore be considered limited to the above-described exemplifying embodiments thereof, since modifications can be made within the scope of the following Claims.

What is claimed is:

1. A method of forwarding a telephone call from a first telephone service subscriber to a second telephone service subscriber and billing a third subscriber for said call, wherein a first subscriber telephone is connected to a second subscriber telephone via a telephone network, said method comprising the steps of: placing a telephone call by dialing on the first subscriber telephone a prefix followed by a third subscriber number corresponding to a third subscriber, dialing on the first subscriber telephone a second subscriber number selected by a caller calling from the first subscriber telephone and corresponding to a second subscriber telephone, connecting the call via said telephone network to a computer unit associated with the third subscriber telephone number and connected to the telephone network, forwarding the call to said second subscriber via the computer unit to connect said first subscriber with said second subscriber, detecting said prefix within the telephone network, billing the cost of the call between the first subscriber and the second subscriber to the third subscriber, transmitting information during the call established between the first subscriber and the second subscriber at given time intervals, wherein said computer unit transmits stored information having different information contents to each of the first and the second subscribers, respectively, when the first and the second subscriber telephones are located in different places.

2. A method according to claim 1, wherein the computer unit transmits information having different information contents to the first and second subscribers when the first and second subscriber telephones are located in different area code districts.

3. A method according to claim 2, wherein the information transmitted can be heard by the first and the second subscriber without the first and the second subscriber being able to converse with one another as the information is transmitted.

4. A method according to claim 2, wherein the information transmitted can be heard by the first and the second subscriber and the first and second subscribers can converse with one another at the time the information is transmitted.

5. A method according to claim 2, wherein the information transmission time is less than 20% of the total call time.

6. A method according to claim 2, wherein the connection time of the call between the first and second subscribers is limited to a time duration corresponding to a predetermined call cost.

7. A method according to claim 1, wherein the different information contents transmitted to each of the first and second subscribers are transmitted at the same time.

8. Apparatus for forwarding and billing a telephone call, wherein a first subscriber telephone is connected to a second subscriber telephone via a telephone network, said apparatus comprising: a telephone network including first, second, and third subscribers, a computer unit associated with the third subscriber and connected to the telephone network, wherein the computer unit can detect a prefix dialled by the first subscriber followed by a second subscriber number selected by the first subscriber and forwards the call via the telephone network, upon detection of the prefix, to the second subscriber number that has been dialled by the first subscriber and which connects the first subscriber with the second subscriber, wherein the telephone network can bill the subscription of the third subscriber for the call connected between the first and the second subscribers upon detection of said prefix and wherein the computer unit transmits information during the call connection between the first subscriber and the second subscriber at given time intervals, the information transmitted to the first subscriber being different from the information transmitted to the second subscriber when the first and second subscriber telephones are located in different places.

9. Apparatus according to claim 8, wherein the computer unit transmits different information to the first and second subscribers when the first and second subscriber telephones are located in different area code districts.

10. Apparatus according to claim 8, wherein the computer unit transmits said information in a manner such that both the first subscriber and the second subscriber are able to hear the information but are unable to converse with one another during the information transmission.

11. Apparatus according to claim 9, wherein the computer unit transmits said information in a manner such that both the first subscriber and the second subscriber hear the information and are able to converse with one another as the information is transmitted.

12. Apparatus according to claim 9, wherein the computer unit transmits said information over a time period such that the total information transmission time constitutes less than 20% of the total call time.

13. Apparatus according to claim 9, wherein the computer unit limits the connected call to a time duration that corresponds to a predetermined call cost.

14. Apparatus according to claim 8, wherein the different information transmitted to each of the first and second subscribers is transmitted at the same time.

* * * * *